(12) United States Patent
Kim

(10) Patent No.: US 12,638,095 B2
(45) Date of Patent: May 26, 2026

(54) SOLENOID VALVE

(71) Applicant: HL MANDO CORPORATION,
Gyeonggi-do (KR)

(72) Inventor: Juhye Kim, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 16 days.

(21) Appl. No.: 18/761,254

(22) Filed: Jul. 1, 2024

(65) Prior Publication Data

US 2025/0155046 A1 May 15, 2025

(30) Foreign Application Priority Data

Nov. 9, 2023 (KR) ......................... 10-2023-0154854

(51) Int. Cl.
*F16K 31/06* (2006.01)
(52) U.S. Cl.
CPC ...... *F16K 31/0655* (2013.01); *F16K 31/0696*
(2013.01)
(58) Field of Classification Search
None
See application file for complete search history.

(56) References Cited

U.S. PATENT DOCUMENTS

| | | | | |
|---|---|---|---|---|
| 4,108,420 A | * | 8/1978 | West | F16K 31/0658 |
| | | | | 251/129.08 |
| 5,722,633 A | * | 3/1998 | Goossens | B60T 8/5025 |
| | | | | 303/119.2 |

| | | | | |
|---|---|---|---|---|
| 6,065,734 A | * | 5/2000 | Tackett | F16K 31/0693 |
| | | | | 303/119.2 |
| 6,776,391 B1 | * | 8/2004 | Goossens | B60T 8/363 |
| | | | | 251/337 |
| 8,540,212 B2 | * | 9/2013 | Speer | F16K 31/0665 |
| | | | | 251/64 |
| 8,590,859 B2 | * | 11/2013 | Kurz | F16K 31/0665 |
| | | | | 251/64 |
| 8,870,160 B2 | * | 10/2014 | Ambrosi | B60T 8/363 |
| | | | | 251/64 |
| 9,080,684 B2 | * | 7/2015 | Stahr | H01F 7/081 |
| 9,714,018 B2 | * | 7/2017 | Jeon | B60T 8/363 |
| 10,993,546 B2 | * | 5/2021 | Shakal | A47C 27/083 |
| 11,110,905 B2 | * | 9/2021 | Jeon | B60T 15/043 |

(Continued)

FOREIGN PATENT DOCUMENTS

| | | |
|---|---|---|
| KR | 10-1622149 | 5/2016 |
| KR | 10-2016-0091565 | 8/2016 |
| KR | 10-2017-0065826 | 6/2017 |

*Primary Examiner* — Matthew W Jellett
(74) *Attorney, Agent, or Firm* — WOMBLE BOND
DICKINSON (US) LLP

(57) ABSTRACT

A solenoid valve, comprising: a valve core formed with an
inlet and an outlet, a valve dome sealing one end of the valve
core, an armature provided inside the valve dome to be able
to advance and retreat, and a plunger opening and closing
the inlet of the valve core according to the advance and
retreat of the armature, in which the armature includes a
receiving groove recessed in an upper surface, a buffering
member provided between the armature and the valve dome,
and a damping spring received in the receiving groove so
that the upper surface of the buffering member is in close
contact with the valve dome and elastically supporting the
buffering member to the valve dome.

15 Claims, 8 Drawing Sheets

(56)                    References Cited

U.S. PATENT DOCUMENTS

| 11,313,488 B2 * | 4/2022 | Lee | ......................... | B60T 8/363 |
| 11,953,103 B2 * | 4/2024 | Hirano | ................ | F16K 31/0686 |
| 2005/0056800 A1 * | 3/2005 | Modien | .............. | F16K 31/0651 |
| | | | | 251/64 |
| 2010/0276618 A1 * | 11/2010 | Schulz | ................ | F16K 31/0693 |
| | | | | 251/129.15 |
| 2012/0161047 A1 * | 6/2012 | Ambrosi | ............ | F16K 31/0686 |
| | | | | 251/129.15 |
| 2015/0130265 A1 * | 5/2015 | Leventhal | ............ | B60T 13/662 |
| | | | | 251/48 |
| 2019/0186651 A1 * | 6/2019 | Pellmann | ............ | F16K 31/0655 |
| 2022/0221080 A1 * | 7/2022 | Shioi | ................... | F16K 31/0696 |

* cited by examiner

2200

1

SOLENOID VALVE

CROSS-REFERENCE TO RELATED APPLICATIONS

This application claims the benefit of and priority of Korean Patent Application No. 10-2023-0154854 filed on Nov. 9, 2023, in the Korean Intellectual Property Office, the disclosure of which is incorporated herein by reference in its entirety.

BACKGROUND

Field

The present disclosure relates to a solenoid valve, and more particularly, to a solenoid valve device capable of reducing noise and vibration caused by an operation of a solenoid valve, and a method of operating the same.

Description of the Related Art

A typical vehicle brake system detects a wheel slip and controls braking pressure applied to a wheel to prevent the wheel from locking during braking, thereby ensuring that the wheel does not slip and maintains the direction during the braking to achieve the safe braking.

The brake system is equipped with a number of solenoid valves that open and close a flow path of a brake hydraulic line to control the braking pressure. Solenoid valves include a normal open type solenoid valve that maintains a normally open state, and a normal closed type solenoid valve that maintains a normally closed state.

Conventionally, the normal open type solenoid valve is installed in a modulator block to increase integration, and a valve bore is cut so that the valve may be installed in the modulator block.

This valve bore is connected to an internal flow path formed in the modulator block, and at the same time, the valve core is installed by being inserted into the valve bore.

A cylindrical valve dome is coupled at one end of the above-described valve core to allow an armature installed in a hollow therein to advance and retreat. The armature is provided with a plunger integrally formed at one end to open and close an orifice of the valve seat through the advance and retreat, and a return spring is installed between the plunger and the valve seat.

Meanwhile, when power is applied to a coil to operate the solenoid valve, a groove is formed on an outer side surface of the armature in a longitudinal direction to ensure quick response of the armature. This groove reduces oil hydraulic pressure to allow the armature to quickly move the plunger, so the plunger may block the orifice. However, the quick response of the armature also is applied when returning, so the armature or a buffering member collides with the valve dome. Due to this collision, a driver may feel an operating sound of the solenoid valve.

Recently, as the automobile industry has changed from internal combustion engines to electric vehicles, noise standards during the vehicle operation have increased. Accordingly, the demand for reduction of noise and vibration of the solenoid valve is increasing. In particular, since the operating sound of the solenoid valve is caused by the collision with the valve dome and high resultant force of the return spring, countermeasures against these are required.

SUMMARY

An object to be achieved by the present disclosure is to provide a solenoid valve capable of reducing noise and vibration caused by an operation of the solenoid valve, and a method of operating the same.

Another object to be achieved by the present disclosure is to provide a solenoid valve in which a shock surface may be changed according to an operation of the solenoid valve, and a method of operating the same.

Still another object to be achieved by the present disclosure is to provide a solenoid valve capable of buffering shock caused by an operation of the solenoid valve, and a method of operating the same.

Still yet another object to be achieved by the present disclosure is to provide a solenoid valve capable of reducing a resultant force of a spring generated according to an operation of the solenoid valve, and a method of operating the same.

According to an aspect of the present disclosure, a solenoid valve includes: a valve core formed with an inlet and an outlet, a valve dome sealing one end of the valve core, an armature provided inside the valve dome to be able to advance and retreat, and a plunger opening and closing the inlet of the valve core according to the advance and retreat of the armature, in which the armature includes a receiving groove recessed in an upper surface, a buffering member provided between the armature and the valve dome, and a damping spring received in the receiving groove so that the upper surface of the buffering member is in close contact with the valve dome and elastically supporting the buffering member to the valve dome.

The damping spring may elastically support a lower surface of the buffering member upward so that the upper surface of the buffering member is in close contact with the valve dome even when the armature moves downward.

The buffering member may include a flow path hole that communicates fluid from an outer side to an inner side of the receiving groove.

A plurality of flow path holes may be provided.

The buffering member may include a support part disposed between the upper surface of the armature and the valve dome to buffer and support the armature, and an insertion part connected to the support part and inserted into the receiving groove of the armature.

The support part may include a first flow path hole recessed in the lower surface, and the insertion part may include a second flow path hole that is recessed in an outer peripheral surface and connected to the first flow path hole.

The insertion part may be provided to be slidable in the receiving groove of the armature.

The receiving groove may be provided in a cylindrical shape, and the insertion part may be provided in a cylindrical shape and have a diameter larger than that of the receiving groove.

The buffering member may have a circumference of the upper surface being in close contact with the valve dome, and a center of the upper surface may have a space with the valve dome.

The buffering member may have a flat upper surface, and the valve dome may be in contact with a circumference of the upper surface of the buffering member and may be formed convexly so that a center thereof is spaced apart.

The receiving groove may include a first receiving groove in which the insertion portion is received, and a second receiving groove connected to a lower end of the first receiving groove to receive the damping spring.

The second receiving groove may have a diameter smaller than that of the first receiving groove.

The first receiving groove may be narrower in diameter toward a portion where the first receiving groove is connected to the second receiving groove, and an inner side surface thereof may be formed to be inclined.

The insertion part may have a lower diameter smaller than the upper diameter so that the insertion part is at least partially inserted into the second receiving groove.

The armature may include a third receiving groove provided at a lower end of the receiving groove to receive the fluid flowing in through the flow path hole.

The third receiving groove may have a diameter smaller than that of a second receiving groove that receives the damping spring.

The second receiving groove may be narrower in diameter toward a portion where the second receiving groove is connected to the third receiving groove, and an inner side surface thereof may be formed to be inclined.

According to another aspect of the present disclosure, a method of operating a solenoid valve includes: a valve core formed with an inlet and an outlet, a valve dome sealing one end of the valve core, an armature provided inside the valve dome to be able to advance and retreat, and a plunger opening and closing the inlet of the valve core according to the advance and retreat of the armature, in which when the armature moves downward and moves away from the valve dome, a buffering member provided in a receiving groove recessed in an upper surface of the armature is elastically supported by a damping spring received in the receiving groove and whose upper surface is in close contact with the valve dome, and when the armature moves upward and approaches the valve dome, the buffering member slides in the receiving groove so that the upper surface of the armature is in contact with a lower surface of the buffering member.

The solenoid valve may include a flow path hole that communicates fluid from an outer side to an inner side of the receiving groove, when the armature moves downward and moves away from the valve dome, the fluid provided on the outer side of the receiving groove may flow into the inner side through the flow path hole and a space spaced between the armature and the buffering member, and when the armature moves upward and approaches the valve dome, the fluid provided on the inner side of the receiving groove may flow out to the outer side through the flow path hole, and the fluid flowing out may provide pressure to the buffering member upward.

The solenoid valve may include a third receiving groove provided at a lower end of the receiving groove, and when the armature moves upward and approaches the valve dome, the fluid flowing into the receiving groove along the flow path hole may flow into the third receiving groove.

The present exemplary embodiment provides a solenoid valve capable of reducing noise and vibration caused by an operation of the solenoid valve, and a method of operating the same.

The present exemplary embodiment provides a solenoid valve in which a shock surface may be changed according to an operation of the solenoid valve, and a method of operating the same.

The present exemplary embodiment provides a solenoid valve capable of buffering shock caused by an operation of the solenoid valve, and a method of operating the same.

The present exemplary embodiment provides a solenoid valve capable of reducing a resultant force of a spring generated according to an operation of the solenoid valve, and a method of operating the same.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Hereinafter, the present exemplary embodiments will be described in detail with reference to the accompanying drawings. The following exemplary embodiments are presented to sufficiently convey the idea of the present disclosure to those skilled in the art. The present disclosure is not limited only to the exemplary embodiments to be presented below, but may be embodied in other forms. In order to clarify the present disclosure, parts unrelated to the description may be omitted, and a size of components may be slightly exaggerated to aid understanding.

Figure 1:
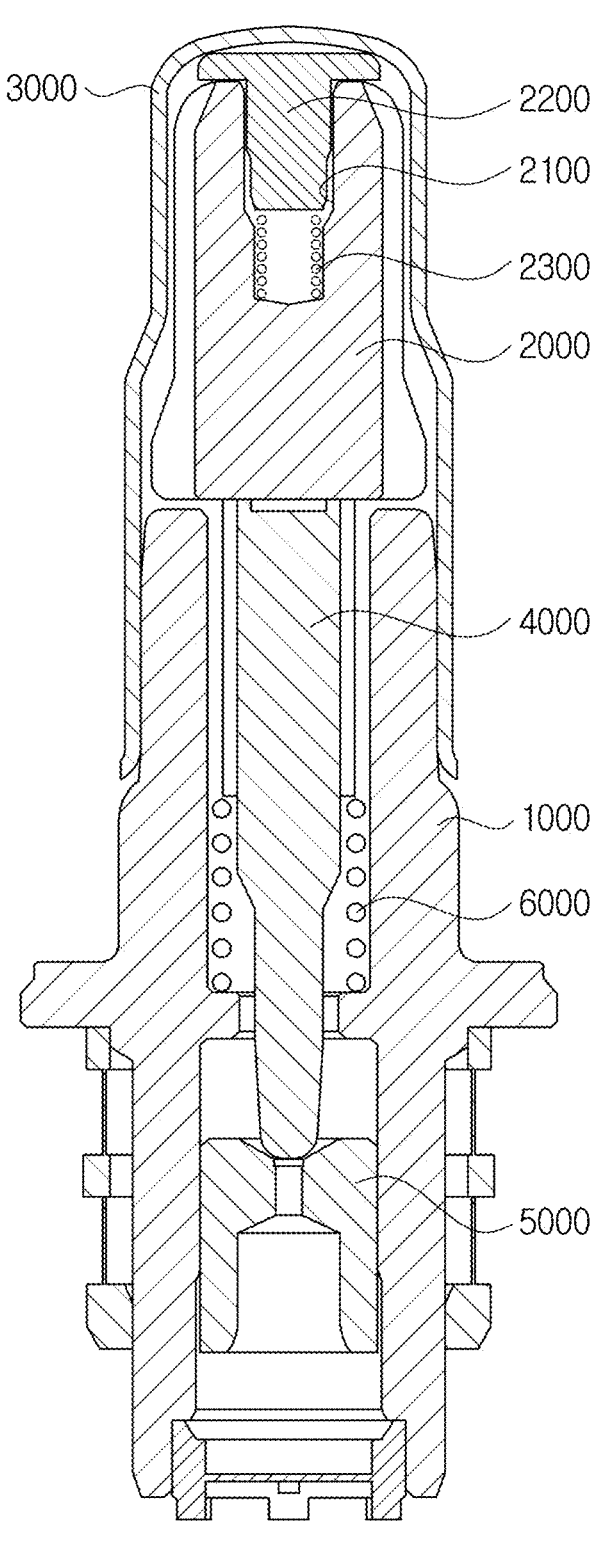
FIG. 1 is a cross-sectional view schematically illustrating a solenoid valve according to a first exemplary embodiment of the present disclosure.

FIG. 1 is a cross-sectional view schematically illustrating a solenoid valve according to a first exemplary embodiment of the present disclosure.

Referring to FIG. 1, a solenoid valve according to the first exemplary embodiment of the present disclosure has a general structure including a valve core 1000, an armature 2000 provided at an upper end of the valve core 1000, a valve seat 5000 provided at a lower end of the valve core 1000, a plunger 4000 interposed between the valve core 1000 and the valve seat 5000, a return spring 6000 interposed between the plunger 4000 and the valve seat 5000, a cylindrical valve dome 3000 surrounding a side surface of the valve core 1000 and an upper side of the armature 2000, and a buffering member 2200 and a damping spring 2300 between the valve dome 3000 and the armature 2000.

An operation of the solenoid valve provided in the vehicle is controlled by an electric control unit (ECU) (not illustrated), and opens/closes a flow path supplied to wheels or controls an operation of a hydraulic pump to enable intermittent braking through a return flow path.

The solenoid valve includes a normal open type solenoid valve that maintains a normally open state, and a normal closed type solenoid valve that maintains a normally closed state.

The valve core 1000 is a component that forms a body of the solenoid valve, and has a longitudinal through hole formed in a center thereof and an inlet and outlet, through which oil flows and is discharged, provided at a lower end thereof.

The valve dome 3000 is provided in a thin cylindrical shape and surrounds an upper end portion of the valve core 1000 to seal one end of the valve core 1000.

The armature 2000 is provided in a longitudinal direction on an inner side of the valve dome 3000 and is installed in a cylindrical shape to be able to advance and retreat over a predetermined section. An outer surface of the valve dome 3000 is covered with a cylindrical excitation coil (not illustrated) receiving power to advance and retreat the armature 2000.

The plunger 4000 is disposed in a through hole on an inner side of the valve core 1000 and is provided in a rod shape that can advance and retreat in the longitudinal direction. One end of the plunger is disposed adjacent to the valve seat 5000 installed at the inlet of the valve core 1000, and the other end thereof is disposed adjacent to the armature 2000. The inlet of the valve core 1000 is open/closed as the armature 2000 advances and retreats. In this case, an end portion of the plunger 4000 adjacent to the valve seat 5000 may have a round shape on one side or may be coupled to a separate sphere to block a flow of oil by blocking a flow path of the valve seat 5000 when the plunger 4000 advances by an operation of the armature 2000.

The return spring 6000 is disposed between the valve core 1000 and the plunger 4000 through which the plunger 4000 passes. One end of the return spring 6000 may be supported on a step portion close to the valve seat 5000 or may be directly supported on the valve seat 5000. The other end of the return spring 6000 may be supported by being partially inserted into the end portion of the plunger 4000 or may be supported on the step portion provided on the plunger 4000.

The buffering member 2200 is provided between the armature 2000 and the valve dome 3000 to reduce vibration and noise generated when the armature 2000 advances and retreats and collides with the valve dome 3000.

The receiving groove 2100 is recessed in an upper surface of the armature 2000, and the damping spring 2300 is received in the receiving groove 2100 so that an upper surface of the buffering member 2200 is in close contact with the valve dome 3000, and elastically supports the buffering member 2200 to the valve dome 3000.

Figure 2:
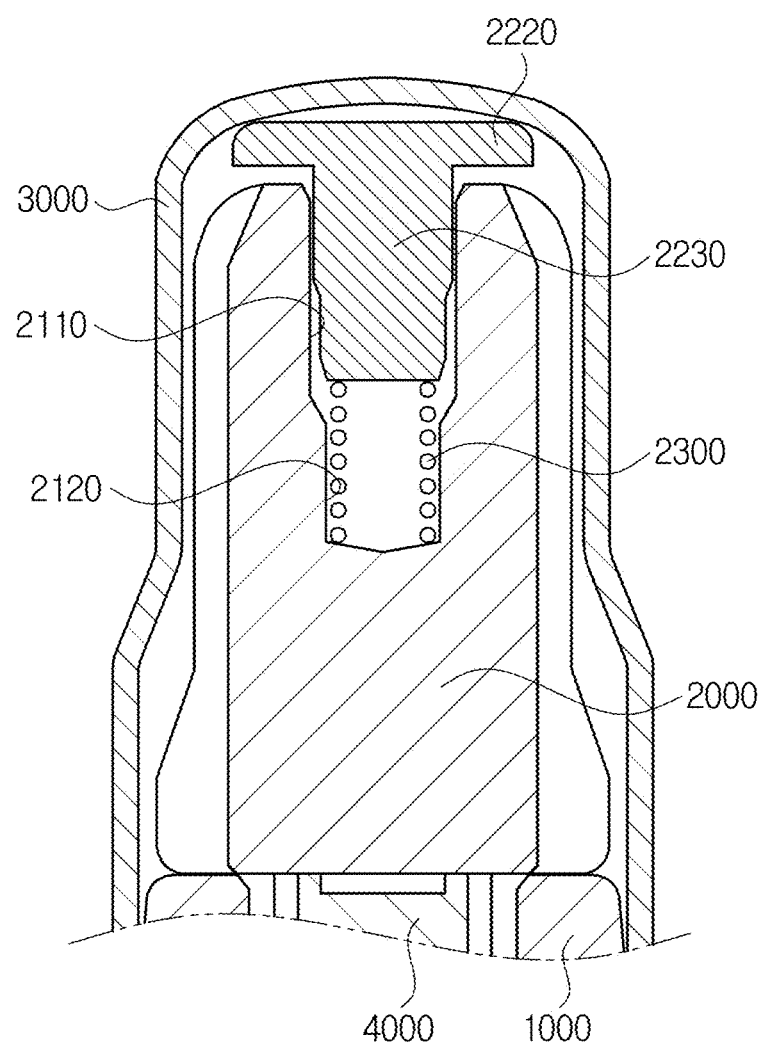
FIG. 2 is a cross-sectional view illustrating an upper portion of the solenoid valve when power is applied to the solenoid valve according to the first exemplary embodiment of the present disclosure.
Figure 3:
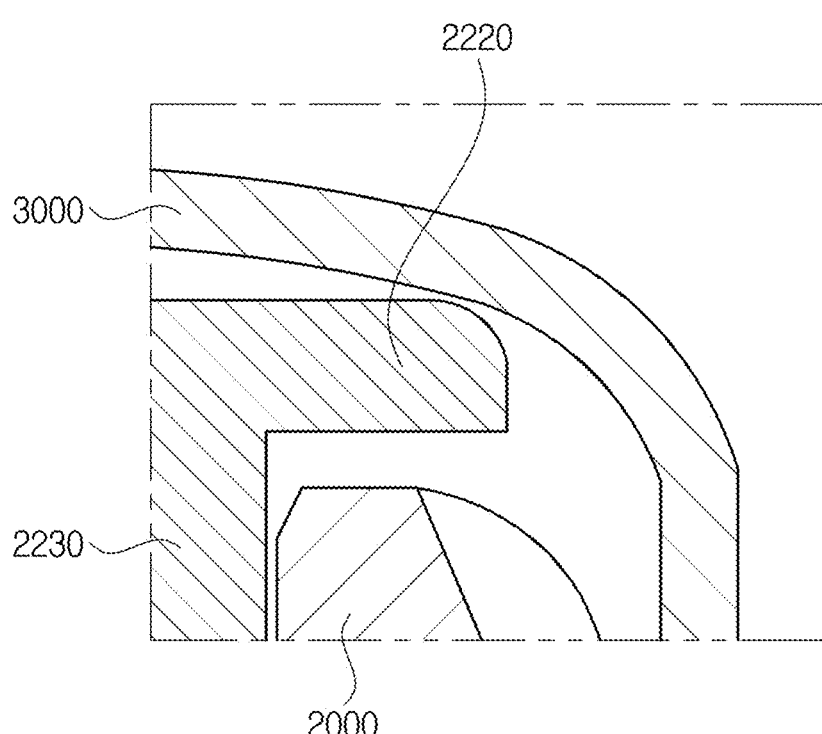
FIG. 3 is an enlarged view of an upper right end of FIG. 2.

FIG. 2 is a cross-sectional view illustrating an upper portion of the solenoid valve when power is applied to the solenoid valve according to the first exemplary embodiment of the present disclosure, and FIG. 3 is an enlarged view of an upper right end of FIG. 2.

Referring to FIGS. 2 and 3, the solenoid valve according to the first exemplary embodiment of the present disclosure is the normal open type solenoid valve and includes the buffering member 2200, the receiving groove 2100, and the damping spring 2300.

In the solenoid valve of the first exemplary embodiment, when power is applied to the excitation coil (not illustrated), the armature 2000 advances in the direction of the valve core 1000. As the armature 2000 moves, the armature 2000 presses the plunger 4000, and as the plunger 4000 moves, a distal end of the plunger 4000 blocks an orifice provided in the valve seat 5000. That is, the flow of oil between the inlet and outlet of the valve core 1000 is blocked.

The damping spring 2300 elastically supports a lower surface of the buffering member 2200 upward so that the upper surface of the buffering member 2200 is in close contact with the valve dome 3000 even when the armature 2000 moves downward. Therefore, when the solenoid valve is turned on, the lower surface of the buffering member 2200 and the upper surface of the armature 2000 are spaced apart from each other by a distance where the armature 2000 is stroked.

In the present disclosure, the expressions lower side, upper side, lower surface, upper surface, downward, and upward are used. For example, there are expressions such as the armature 2000 moving downward and elastically supporting the upper surface of the buffering member 2200 or the lower surface of the buffering member 2200 upward. Based on FIG. 1, the lower side refers to a downward direction below the valve seat 5000, the upper side refers to an upward direction above the valve dome 3000, the lower surface refers to a surface formed on the lower side, and the upper surface refers to a surface formed on the upper side, and the downward refers to a direction of the lower side, and the upward refers to a direction of the upper side. Hereinafter, the expressions lower side, upper side, lower surface, upper surface, downward, and upward may be understood as above.

The buffering member 2200 may be made of an elastic material such as rubber, and a circumference of the upper surface of the buffering member 2200 is in close contact with the valve dome 3000, but a center of the upper surface may be provided with a space with the valve dome 3000. Specifically, the buffering member 2200 may have a flat upper surface, and the valve dome 3000 may be in contact with the circumference of the upper surface of the buffering member 2200 and may be formed convexly so that a center thereof is spaced apart. Therefore, when the armature 2000 presses the buffering member 2200 upward, the center of the buffering member 2200 is deformed upward and may buffer the shock that occurs between the buffering member 2200 and the armature 2000.

Figure 5:
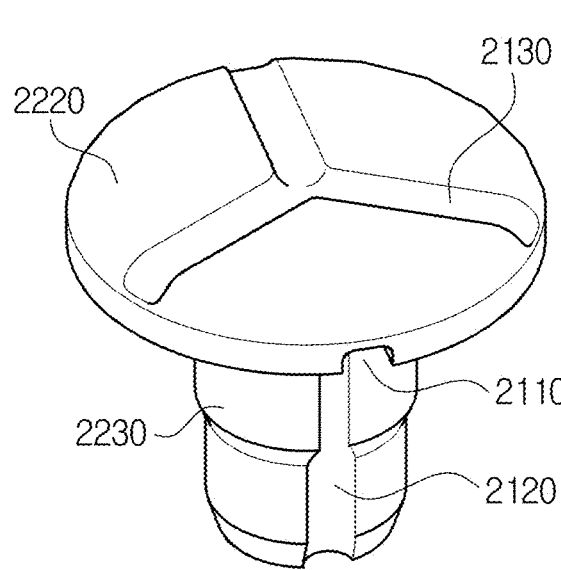
FIG. 5 is a perspective view illustrating a buffering member according to a second exemplary embodiment of the present disclosure when viewed from top.

Referring to FIG. 5, a third flow path hole may be provided on the upper surface of the buffering member 2200. The third flow path hole may be recessed in the upper surface of the buffering member 2200 so fluid communicates with the space provided between the center of the buffering member 2200 and the valve dome 3000 while the upper surface of the buffering member 2200 is deformed. Therefore, the problem of the buffering member 2200 being separated from the receiving groove 2100 due to the movement of the armature 2000 is prevented.

The buffering member 2200 may include a support part 2220 interposed between the upper surface of the armature 2000 and the valve dome 3000 to buffer and support the armature 2000 and an insertion part 2230 connected to the support part 2220 and inserted into the receiving groove 2100 of the armature 2000.

The insertion part 2230 is provided to be slidable in the receiving groove 2100 of the armature 2000. Specifically, the receiving groove 2100 is provided in a cylindrical shape, and the insertion part 2230 is provided in a cylindrical shape, but unlike the conventional case where the insertion part 2230 is press-fitted into the receiving groove 2100, the insertion part 2230 may have a diameter larger than that of the receiving groove 2100.

The receiving groove 2100 may include a first receiving groove 2110 in which the insertion part 2230 is received, and a second receiving groove 2120 that is connected to a lower end of the first receiving groove 2110 and receives the damping spring 2300.

The second receiving groove 2120 may have a diameter smaller than that of the first receiving groove 2110. In addition, a lower side of the insertion part 2230 may have a diameter smaller than that of the upper side so that the insertion part 2230 may be at least partially inserted into the second receiving groove 2120. Therefore, the damping spring 2300 may stably buffer the shock of the armature 2000 and the buffering member 2200 by fixing the position in the second receiving groove 2120 inside the receiving groove 2100 and partially inserting and separating the distal end of the insertion part 2230 into and from the second receiving groove 2120.

Figure 4:
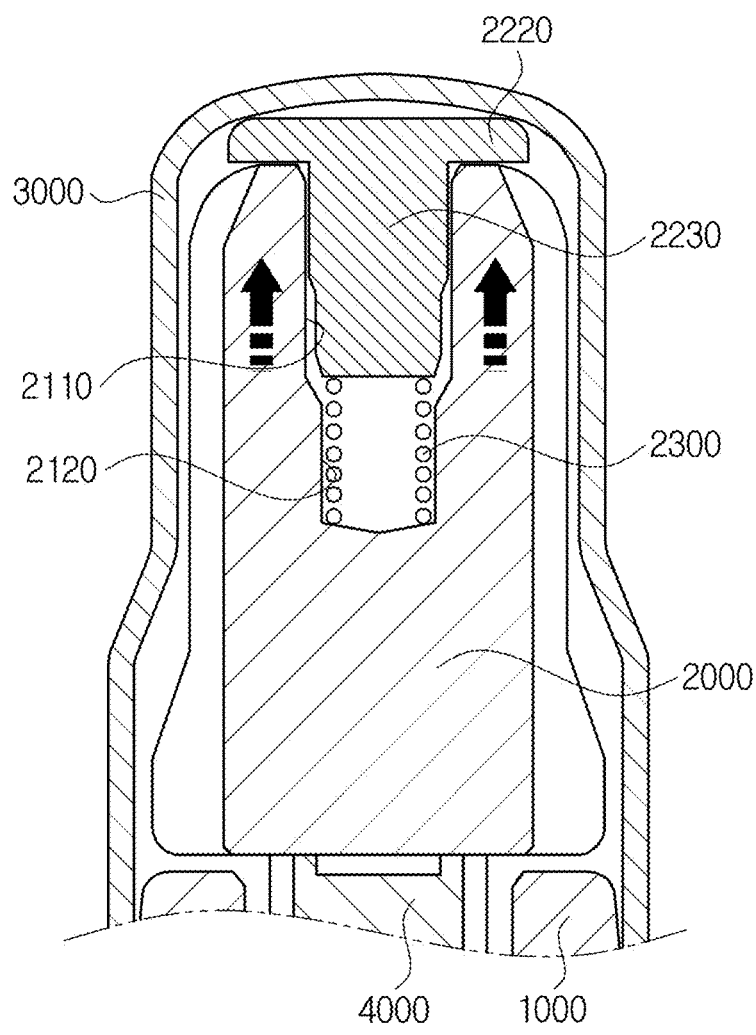
FIG. 4 is a cross-sectional view illustrating the upper portion of the solenoid valve when power is not applied to the solenoid valve according to the first exemplary embodiment of the present disclosure.

FIG. 4 is a cross-sectional view illustrating the upper portion of the solenoid valve when power is not applied to the solenoid valve according to the first exemplary embodiment of the present disclosure.

Referring to FIG. 4, the solenoid valve according to the first exemplary embodiment of the present disclosure switches from an on state to an off state, and the lower surface of the buffering member 2200 and the upper surface of the armature 2000 collide.

Specifically, when the application of power to the excitation coil (not illustrated) of the solenoid valve is released, the armature 2000, which advances in the direction of the valve core 1000, returns by the return spring 6000, and the armature 2000 advances in the direction of the buffering member 2200 while compressing the damping spring 2300. Accordingly, the upper surface of the armature 2000 is in contact with the lower surface of the buffering member 2200. Therefore, the solenoid valve is provided with the damping spring 2300, so that when the conventional normal open type solenoid valve is in the off state, unlike the valve dome 3000 and the armature 2000 or the valve dome 3000 and the buffering member 2200 colliding, the buffering member 2200 and the armature 2000 collide. This change in the collision surface avoids the shock with the valve dome 3000, which is made of steel for rigidity, and reduces the noise and vibration caused by the operation of the solenoid valve.

In addition, in the normal open type solenoid valve, in the on state when power is applied, the return spring 6000 is tensioned, while the damping spring 2300 is compressed, so the resultant force of the return spring 6000 and the damping spring 2300, which determine the shock amount of the solenoid valve, may be reduced.

Figure 6:
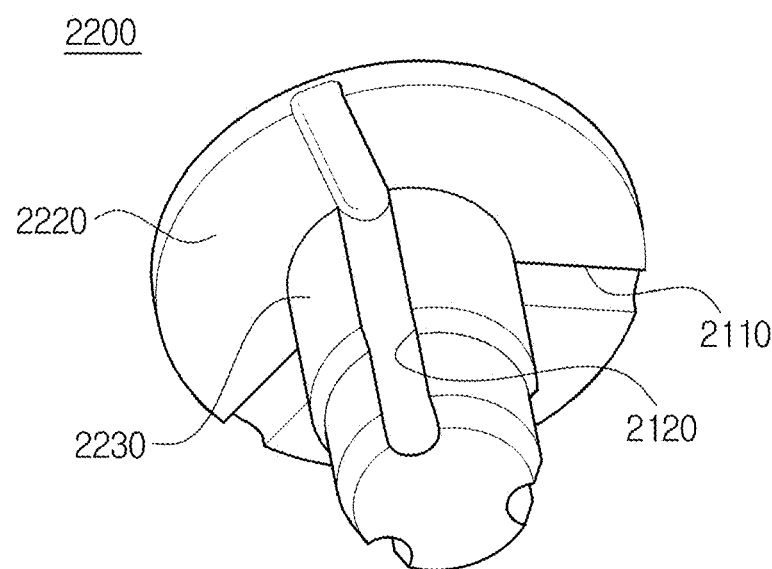
FIG. 6 is a perspective view illustrating the buffering member according to the second exemplary embodiment of the present disclosure when viewed from bottom.
Figure 7:
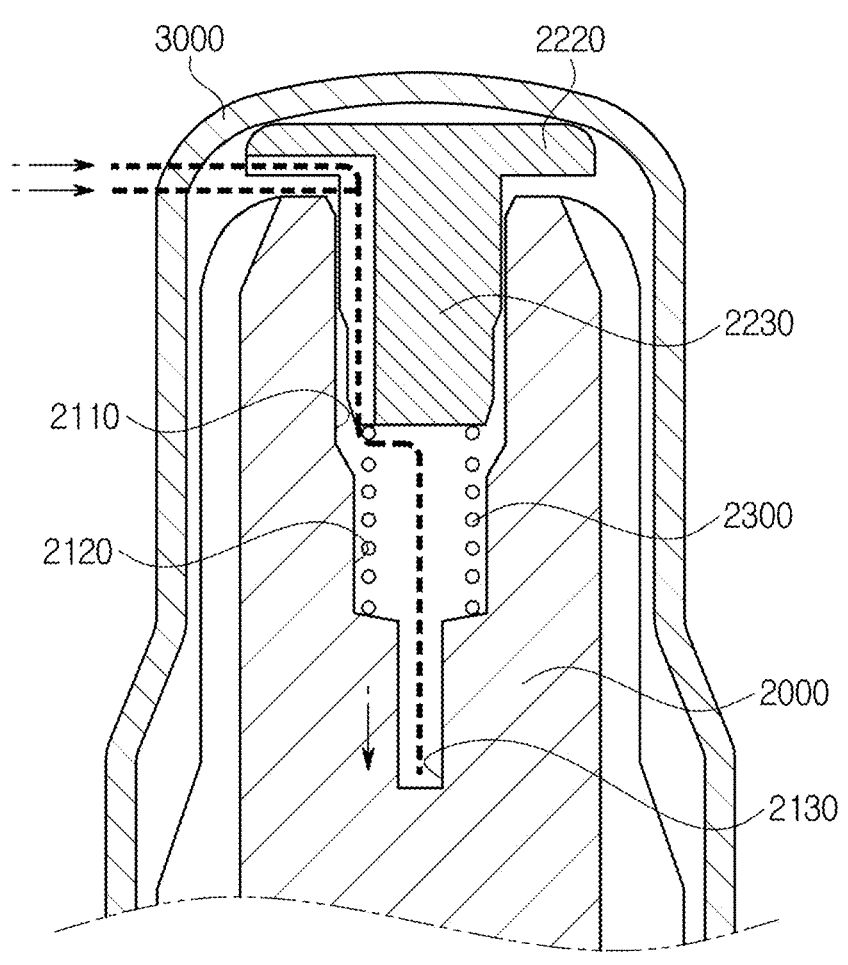
FIG. 7 is a cross-sectional view illustrating the upper portion of the solenoid valve when power is applied to the solenoid valve according to the second exemplary embodiment of the present disclosure.
Figure 8:
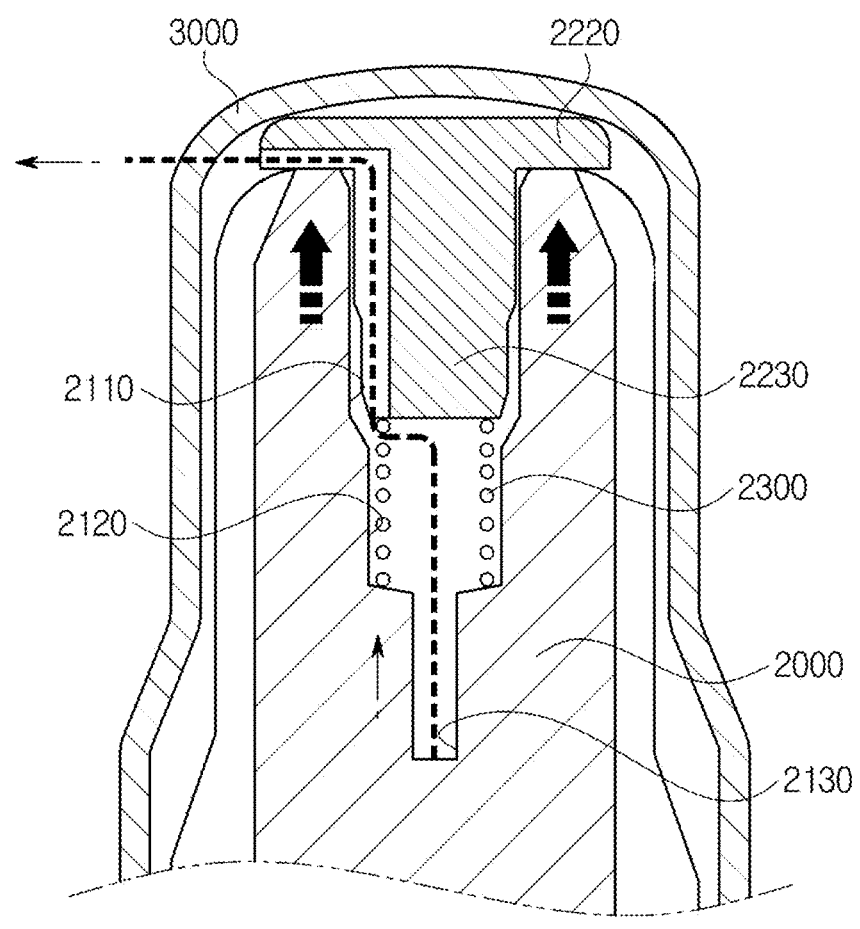
FIG. 8 is a cross-sectional view illustrating the upper portion of the solenoid valve when power is not applied to the solenoid valve according to the second exemplary embodiment of the present disclosure.

FIG. 5 is a perspective view illustrating the buffering member 2200 according to a second exemplary embodiment of the present disclosure when viewed from top, FIG. 6 is a perspective view illustrating the buffering member 2200 according to the second exemplary embodiment of the present disclosure when viewed from bottom, FIG. 7 is a cross-sectional view illustrating the upper portion of the solenoid valve when power is applied to the solenoid valve according to the second exemplary embodiment of the present disclosure, and FIG. 8 is a cross-sectional view illustrating the upper portion of the solenoid valve when power is not applied to the solenoid valve according to the second exemplary embodiment of the present disclosure.

Referring to FIGS. 5 to 8, the second exemplary embodiment of the present disclosure includes all the components of the first exemplary embodiment, and further includes a flow path hole 2210 and a third receiving groove 2130 to alleviate shock by utilizing the movement of fluid and the pressure of the fluid.

The flow path hole 2210 may communicate fluid from the outer side to the inner side of the receiving groove 2100. Specifically, the first flow path hole is recessed in the lower surface of the support part 2220, and the second flow path hole is recessed in the outer peripheral surface of the insertion part 2230. The plurality of flow path holes 2210 may be provided, and the plurality of flow path holes 2210 may be arranged radially symmetrically.

The third receiving groove 2130 may be provided at the lower end of the receiving groove 2100 to receive fluid flowing in through the flow path hole 2210.

The third receiving groove 2130 may be formed to be smaller than the diameter of the second receiving groove 2120. Therefore, the third receiving groove 2130 may receive the fluid flowing into the receiving groove 2100 without receiving the damping spring provided in the second receiving groove 2120.

The first receiving groove 2110 becomes narrower in diameter toward the portion where the first receiving groove 2110 is connected to the second receiving groove 2120, so the inner side surface thereof may be formed to be inclined, and the second receiving groove 2120 becomes narrower in diameter toward the portion where the second receiving groove 2120 is connected to the third receiving groove 2130, so the inner side surface thereof may be formed to be inclined. Therefore, the fluid flowing into the receiving groove 2100 may communicate with little resistance from the first receiving groove 2110 to the second receiving groove 2120 and from the second receiving groove 2120 to the third receiving groove 2130.

Accordingly, in the solenoid valve according to the second exemplary embodiment of the present disclosure, as illustrated in FIG. 7, when power is applied, the fluid on the outer side of the receiving groove 2100 flows into the inner side of the receiving groove 2100 along a gap provided between the lower surface of the buffering member 2200 and the upper surface of the armature 2000 and the flow path hole 2210, and then, as illustrated in FIG. 8, when power is turned off, the fluid on the inner side of the receiving groove 2100 flows out to the outer side of the receiving groove 2100 along the flow path hole 2210. In this way, when the fluid flows out, the fluid flows through a narrower flow path than when the fluid flows in, so when the armature 2000 moves to the upper side, the armature 2000 receives hydraulic pressure downward from the fluid provided in the receiving groove 2100. That is, the collision between the armature 2000 and the buffering member 2200 is buffered through the hydraulic pressure inside the receiving groove 2100.

Hereinafter, the method of operating a solenoid valve according to the first and second exemplary embodiments of the present disclosure will be described.

In the first exemplary embodiment of the present disclosure, when the armature 2000 moves toward the lower side and moves away from the valve dome 3000, the buffering member 2200 is elastically supported by the damping spring 2300 to be in close contact with the valve dome 3000.

Thereafter, when the armature 2000 moves toward the upper side and approaches the valve dome 3000, the buffering member 2200 slides in the receiving groove 2100 so that the upper surface of the armature 2000 is in contact with the lower surface of the buffering member 2200. Therefore, in the collision that occurs during the operation of the solenoid valve, the conventional collision surface is the valve dome 3000 and the armature 2000 or the valve dome 3000 and the buffering member 2200, but the collision surface of the solenoid valve according to the first exemplary embodiment is the armature 2000 and the buffering member 2200. In addition, the solenoid valve according to the first exemplary embodiment has the effect of reducing the spring resultant force by including the damping spring 2300 compared to the conventional solenoid valve.

The second exemplary embodiment of the present disclosure further includes the flow path hole 2210 for communicating the fluid from the outer side to the inner side of the receiving groove 2100 and the third receiving groove 2130 provided at the lower end of the receiving groove 2100 in the first exemplary embodiment.

Therefore, when the armature 2000 moves toward the lower side and moves away from the valve dome 3000, the fluid provided on the outer side of the receiving groove 2100 flows into the inner side through the spaced space between the flow path hole 2210, the armature 2000, and the buffering member 2200, and when the armature 2000 moves toward the upper side and approaches the valve dome 3000, the fluid provided on the inner side of the receiving groove 2100 flows out to the outer side through the flow path hole 2210 and the fluid flowing out may provide pressure to the buffering member 2200 upward. In this case, the fluid flowing into the receiving groove 2100 along the flow path hole 2210 may flow up to the third receiving groove 2130 and be received. Accordingly, the collision that occurs during the operation of the solenoid valve may be buffered by the pressure of the fluid in addition to changing the collision surface or reducing the spring resultant force through the damping spring 2300.

The solenoid valve of the first and second exemplary embodiments of the present disclosure discloses the normal open type solenoid valve, but the present disclosure includes not only the normal open type solenoid valve but also the normal closed type solenoid valve and the method of operating the same. When the solenoid valve of the present disclosure is the normal closed type solenoid valve, in the operating mode of the solenoid, only the moving direction of the armature 2000 according to the application and release of the voltage is reversed, and the operation aspects and effects of each component to generate buffering effect are the same.

In the solenoid valve according to the exemplary embodiment of the present disclosure having such a configuration, the buffering member 2200 is provided between the valve core 1000 and the armature 2000 to primarily buffer the shock resulting from the operation of the solenoid valve, the armature 2000 includes the receiving groove 2100 and the damping spring 2300 to change the shock surface from the valve dome 3000 and the armature 2000 to the valve dome 3000 and the buffering member 2200 to enable second buffering, the damping spring 2300 reduces the spring resultant force of the damping spring 2300 and the return spring 6000 to enable third buffering, the flow path hole 2210 and the third receiving groove 2130 are provided in the buffering member 2200 to enable fourth buffering with the pressure of fluid, and the buffering member 2200 is made of an elastic material and includes the third flow path hole to enable additional buffering. As a result, it is possible to improve the marketability of the vehicle by reducing the noise and vibration caused by the operation of the solenoid valve and improving the driver's braking sensation.

What is claimed is:

1. A solenoid valve, comprising:

a valve core formed with an inlet and an outlet;

a valve dome sealing one end of the valve core;

an armature provided inside the valve dome to be able to advance and retreat; and a plunger opening and closing the inlet of the valve core according to the advance and retreat of the armature, wherein the armature includes:

a receiving groove recessed in an upper surface;

a buffering member provided between the armature and the valve dome; and a damping spring received in the receiving groove so that an upper surface of the buffering member is in close contact with the valve dome and elastically supporting the buffering member to the valve dome, wherein the buffering member includes:

a support part disposed between the upper surface of the armature and the valve dome to buffer and support the armature; and an insertion part connected to the support part and inserted into the receiving groove of the armature, wherein the receiving groove includes:

a first receiving groove in which the insertion portion is received; and a second receiving groove connected to a lower end of the first receiving groove to receive the damping spring, wherein the armature includes a third receiving groove provided at a lower end of the receiving groove to receive the fluid flowing in through at least one flow path hole, wherein the buffering member includes the at least one flow path hole that communicates fluid from an outer side to an inner side of the receiving groove, wherein the second receiving groove becomes narrower in diameter toward a portion where the second receiving groove is connected to the third receiving groove, and an inner side surface thereof is formed to be inclined.

2. The solenoid valve of claim 1, wherein the damping spring elastically supports a lower surface of the buffering member upward so that the upper surface of the buffering member is in close contact with the valve dome even when the armature moves downward.

3. The solenoid valve of claim 1, wherein the at least one flow path hole of the buffering member comprises a plurality of flow path holes.

4. The solenoid valve of claim 1, wherein the support part includes a first flow path hole recessed in a lower surface, and the insertion part includes a second flow path hole that is recessed in an outer peripheral surface of the insertion part and connected to the first flow path hole.

5. The solenoid valve of claim 1, wherein the insertion part is provided to be slidable in the receiving groove of the armature.

6. The solenoid valve of claim 5, wherein the receiving groove is provided in a cylindrical shape, and the insertion part is provided in the cylindrical shape and has a diameter larger than that of the receiving groove.

7. The solenoid valve of claim 1, wherein the buffering member has a circumference of the upper surface being in close contact with the valve dome, and a center of the upper surface has a space with the valve dome.

8. The solenoid valve of claim 7, wherein the buffering member has a flat upper surface, and the valve dome is in contact with the circumference of the upper surface of the buffering member and is formed convexly so that a center thereof is spaced apart.

9. The solenoid valve of claim 1, wherein the second receiving groove has a diameter smaller than that of the first receiving groove.

10. The solenoid valve of claim 9, wherein the first receiving groove becomes narrower in diameter toward a portion where the first receiving groove is connected to the second receiving groove, and an inner side surface thereof is formed to be inclined.

11. The solenoid valve of claim 9, wherein the insertion part has a lower diameter smaller than an upper diameter so that the insertion part is at least partially inserted into the second receiving groove.

12. The solenoid valve of claim 1, wherein the third receiving groove has a diameter smaller than that of a second receiving groove that receives the damping spring.

13. A method of operating the solenoid valve of claim 1, comprising:

a valve core formed with an inlet and an outlet;

a valve dome sealing one end of the valve core;

an armature provided inside the valve dome to be able to advance and retreat; and a plunger opening and closing the inlet of the valve core according to the advance and retreat of the armature, wherein when the armature moves downward and moves away from the valve dome, a buffering member provided in a receiving groove recessed in an upper surface of the armature is elastically supported by a damping spring received in the receiving groove and whose upper surface is in close contact with the valve dome, and when the armature moves upward and approaches the valve dome, the buffering member slides in the receiving groove so that the upper surface of the armature is in contact with a lower surface of the buffering member.

14. The method of operating a solenoid valve of claim 13, wherein the solenoid valve includes a flow path hole that communicates fluid from an outer side to an inner side of the receiving groove, when the armature moves downward and moves away from the valve dome, the fluid provided on the outer side of the receiving groove flows into the inner side through the flow path hole and a space spaced between the armature and the buffering member, and when the armature moves upward and approaches the valve dome, the fluid provided on the inner side of the receiving groove flows out to the outer side through the flow path hole, and the fluid flowing out provides pressure to the buffering member upward.

15. The method of operating a solenoid valve of claim 14, wherein the solenoid valve includes a third receiving groove provided at a lower end of the receiving groove, and when the armature moves upward and approaches the valve dome, the fluid flowing into the receiving groove along the flow path hole flows into the third receiving groove.

\* \* \* \* \*